(12) United States Patent
Lee et al.

(10) Patent No.: US 10,912,162 B2
(45) Date of Patent: Feb. 2, 2021

(54) PACKING MEMBER AND COOKING APPARATUS HAVING THE SAME

(71) Applicant: Samsung Electronics Co., Ltd., Suwon-si (KR)

(72) Inventors: Chul Woo Lee, Suwon-si (KR); Sun Ki Kim, Suwon-si (KR); Hyoung Jung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 910 days.

(21) Appl. No.: 15/617,391

(22) Filed: Jun. 8, 2017

(65) Prior Publication Data
US 2017/0359862 A1    Dec. 14, 2017

(30) Foreign Application Priority Data

Jun. 9, 2016  (KR) ........................ 10-2016-0071847

(51) Int. Cl.
*H05B 6/66*  (2006.01)
*A47J 37/06*  (2006.01)
(Continued)

(52) U.S. Cl.
CPC ............ *H05B 6/666* (2013.01); *A47J 27/002* (2013.01); *A47J 36/027* (2013.01); *A47J 36/16* (2013.01);
(Continued)

(58) Field of Classification Search
CPC ........ A47J 27/002; A47J 36/027; A47J 36/16; A47J 37/0664; B65D 61/00;
(Continued)

(56) References Cited

U.S. PATENT DOCUMENTS 4,794,005 A    12/1988  Swiontek
5,290,985 A *   3/1994  Jancic ..................... F24C 15/08
                                                        219/725
(Continued)

FOREIGN PATENT DOCUMENTS

EP           0242026        10/1987
KR        1998-035597         8/1998
(Continued)

OTHER PUBLICATIONS

International Search Report dated Aug. 29, 2017 in International Patent Application No. PCT/KR2017/005958.
(Continued)

*Primary Examiner* — Dana Ross
*Assistant Examiner* — Joe E Mills, Jr.
(74) *Attorney, Agent, or Firm* — Staas & Halsey LLP

(57) ABSTRACT

A packing member having a structure capable of reliably extinguishing a fire generated in a cooking apparatus and a cooking apparatus having the packing member are provided. The packing member for packing components of a cooking apparatus includes a flange formed by bending at least one side thereof. The flange is provided to cover at least a portion of an inlet formed at one side of the cooking apparatus to allow external air to be introduced into the cooking apparatus when the packing member is received in the cooking apparatus or at least a portion of an outlet formed to allow air in the cooking apparatus to be discharged.

18 Claims, 8 Drawing Sheets

(51) Int. Cl.
*A47J 27/00* (2006.01)
*A47J 36/02* (2006.01)
*A47J 36/16* (2006.01)
*B65D 81/02* (2006.01)
*H05B 6/64* (2006.01)
*B65D 61/00* (2006.01)

(52) U.S. Cl.
CPC ........ *A47J 37/0664* (2013.01); *B65D 81/025* (2013.01); *H05B 6/6402* (2013.01); *H05B 6/6461* (2013.01); *H05B 6/6473* (2013.01); *B65D 61/00* (2013.01); *H05B 6/6411* (2013.01)

(58) Field of Classification Search
CPC .............. B65D 81/025; B65D 5/48036; B65D 5/48002; B65D 5/48004; H05B 6/6402; H05B 6/6411; H05B 6/6461; H05B 6/6473; H05B 6/666; B29C 63/26
USPC .................................................. 219/730, 759
See application file for complete search history.

(56) References Cited

U.S. PATENT DOCUMENTS

| 7,882,956 | B2* | 2/2011 | McDonald | B65D 81/07 206/583 |
|---|---|---|---|---|
| 2002/0096340 | A1 | 7/2002 | Ondruschka et al. | |
| 2006/0086734 | A1 | 4/2006 | Song et al. | |
| 2008/0149626 | A1 | 6/2008 | Ly | |
| 2008/0156794 | A1* | 7/2008 | Song | H05B 6/6423 219/757 |
| 2011/0298300 | A1* | 12/2011 | Gray | F24F 11/30 307/116 |
| 2015/0250029 | A1* | 9/2015 | Hirata | H05B 6/642 219/757 |
| 2016/0355317 | A1* | 12/2016 | Nishijima | B65D 85/68 |

FOREIGN PATENT DOCUMENTS

| KR | 20-0125936 | 10/1998 |
|---|---|---|
| KR | 20-0126683 | 10/1998 |
| KR | 1999-0024534 | 7/1999 |
| KR | 1999-0058198 | 7/1999 |
| KR | 10-2001-0060674 | 7/2001 |

OTHER PUBLICATIONS

Extended European Search Report dated May 17, 2019 in European Patent Application No. 17810557.3.

Extended European Search Report dated Aug. 21, 2019 in European Patent Application No. 17810557.3.

* cited by examiner

PACKING MEMBER AND COOKING APPARATUS HAVING THE SAME

CROSS-REFERENCE TO RELATED APPLICATION(S)

This application claims the benefit of Korean Patent Application No. 10-2016-0071847, filed on Jun. 9, 2016 in the Korean Intellectual Property Office, the disclosure of which is incorporated herein by reference.

BACKGROUND

1. Field

Embodiments of the present disclosure relate to a packing member for packing components provided in a cooking apparatus and a cooking apparatus having the packing member.

2. Description of the Related Art

A cooking apparatus is an apparatus that cooks food by raising the temperature of the food. Generally, cooking apparatuses include a microwave oven configured to irradiate food with microwaves, a gas oven or an electric oven configured to heat food directly. The microwave oven is an apparatus that cooks food using frictional heat generated by the translational movement of water molecules contained in food by irradiating the microwave generated from a magnetron to the food.

In a cooking apparatus such as a microwave oven, a plate for placing food is provided. The plate may be provided to rotate inside the cooking apparatus so that the food placed on the plate is uniformly cooked.

When the cooking apparatus is packaged and transported after being produced, the plate may be fixed so as not to move by a packing member inside the cooking apparatus. Also, the plate may be prevented from being damaged by an external impact by the packing member. The packing member may be made of a material such as thick paper or Styrofoam. Inside the cooking apparatus, a manual describing how to use the cooking apparatus may be placed.

In use of a new cooking apparatus, a user may operate the cooking apparatus after removing the packing member and the manual from the cooking apparatus. However, it may happen that the cooking apparatus is operated with the packing member and the manual placed inside the cooking apparatus.

In such a case, the temperature of the packing member and the manual may be raised by a heating means such as a microwave or a heater, and a fire may occur. At this time, there is a need for a structure capable of stably extinguishing a fire generated in the cooking apparatus so that the fire does not spread to the outside of the cooking apparatus.

SUMMARY

Therefore, it is an aspect of the present disclosure to provide a packing member having a structure capable of reliably extinguishing a fire generated in a cooking apparatus and a cooking apparatus having the packing member.

Additional aspects of the disclosure will be set forth in part in the description which follows and, in part, will be obvious from the description, or may be learned by practice of the disclosure.

In accordance with one aspect of the present disclosure, a packing member for packing components of a cooking apparatus includes a flange formed by bending at least one side thereof. The flange is provided to cover at least a portion of an inlet formed at one side of the cooking apparatus to allow external air to be introduced into the cooking apparatus when the packing member is received in the cooking apparatus or at least a portion of an outlet formed to allow air in the cooking apparatus to be discharged.

The flange may include a first flange to cover at least a portion of the outlet and a second flange to cover at least a portion of the inlet.

The first flange may be located at one side of the packing member, and the second flange may be located at the other side of the packing member.

The inlet may be provided at a side surface of the cooking apparatus, and the outlet may be provided at an upper surface of the cooking apparatus.

The flange may be configured to cover the entire inlet.

The flange may be configured to cover the entire outlet.

The flange may be configured to cover half of the area of the outlet.

The packing member may be provided with a receiving portion in which the components of the cooking apparatus are received.

The receiving portion may be formed by bending a part of the packing member.

The packing member may be provided to surround at least a part of the components of the cooking apparatus.

In accordance with another aspect of the present disclosure, a cooking apparatus comprises a frame in which a cooking chamber, an inlet and an outlet are formed, a plate received in the cooking chamber and a packing member to surround at least a portion of the plate. One side of the packing member covers at least a portion of the inlet, and the other side of the packing member covers at least a portion of the outlet.

The packing member may include a first flange and a second flange formed by bending a part of the packing member to cover at least a portion of the outlet or the inlet.

The first flange may be configured to cover the entire outlet.

The second flange may be configured to cover the entire inlet.

The packing member may be made of a material containing any one of paper and Styrofoam.

A cutoff switch to turn on or off an operation of the cooking apparatus may be located at the outlet.

If a fire occurs in the cooking chamber, the cutoff switch may be provided to disconnect a circuit associated with the operation of the cooking apparatus.

The cooking apparatus may comprise a fan to circulate air inside the cooking chamber. The fan may stop when the circuit is disconnected by the cutoff switch.

The cutoff switch may include a bimetal material.

The outlet may be formed on an upper surface of the frame and the inlet may be formed on a side surface of the frame.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
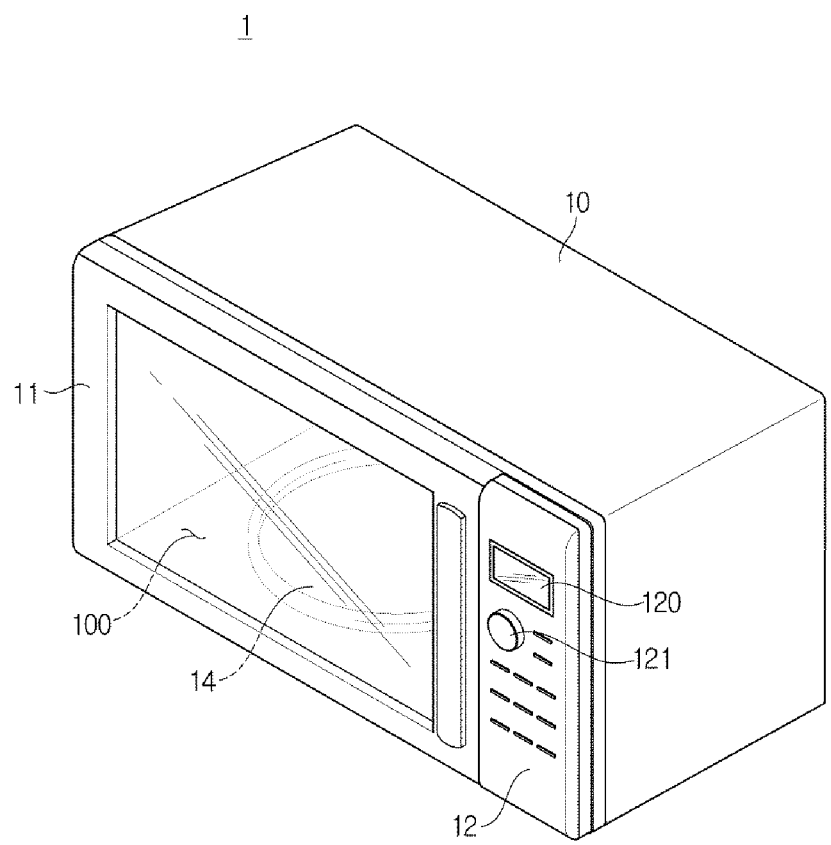
FIG. 1 is a view illustrating a cooking apparatus according to an embodiment.

The embodiments described herein and the configurations shown in the drawings are only examples of preferred embodiments of the present disclosure, and various modifications may be made at the time of filing of the present application to replace the embodiments and drawings of the present specification.

In addition, the same reference numerals or symbols shown in the drawings of the present specification indicate components or components that perform substantially the same function.

Throughout the specification, the terms used are merely used to describe particular embodiments, and are not intended to limit the present disclosure.

As used herein, the singular forms "a," "an" and "the" are intended to include the plural forms as well, unless the context clearly indicates otherwise.

Also, it is to be understood that terms such as "include," "have," or the like, are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

It is also to be understood that terms including ordinals such as "first," "second" and the like used herein may be used to describe various elements, but the elements are not limited to the terms. They are used only for the purpose of distinguishing one component from another. For example, the first component may be referred to as a second component, and similarly, the second component may also be referred to as a first component.

The term "and/or" includes any combination of a plurality of related listed items or any of the plurality of related listed items.

Hereinafter, a packing member and a cooking apparatus having the packing member according to an embodiment will be described in detail with reference to the drawings.

Figure 2:
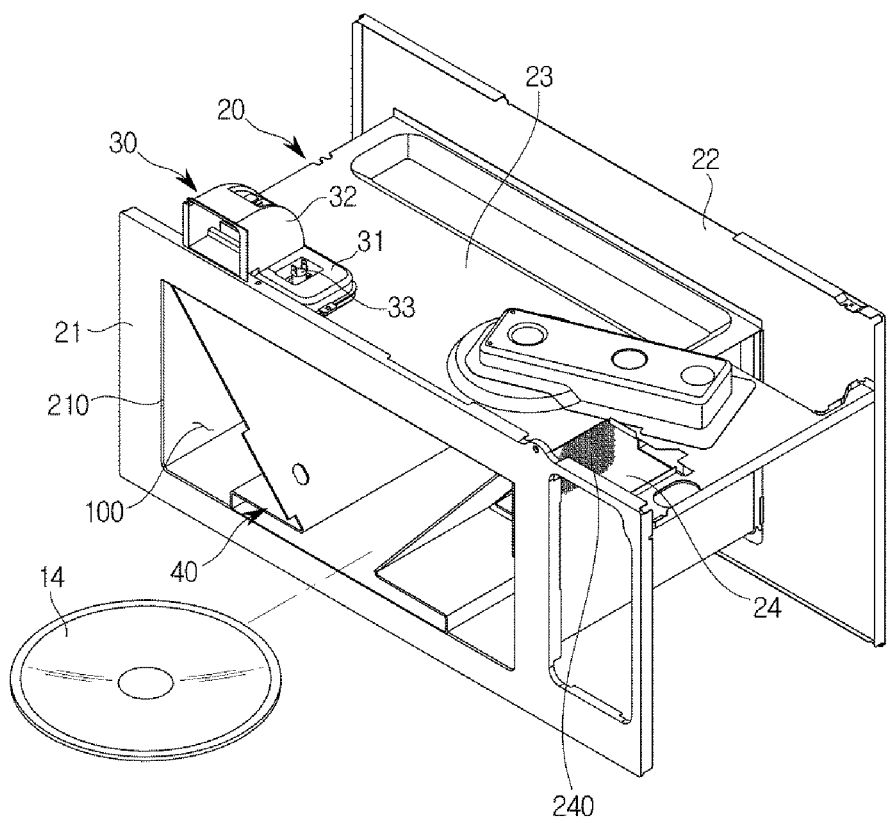
FIG. 2 is a view illustrating a frame unit and a packing member of a cooking apparatus according to an embodiment.
Figure 3:
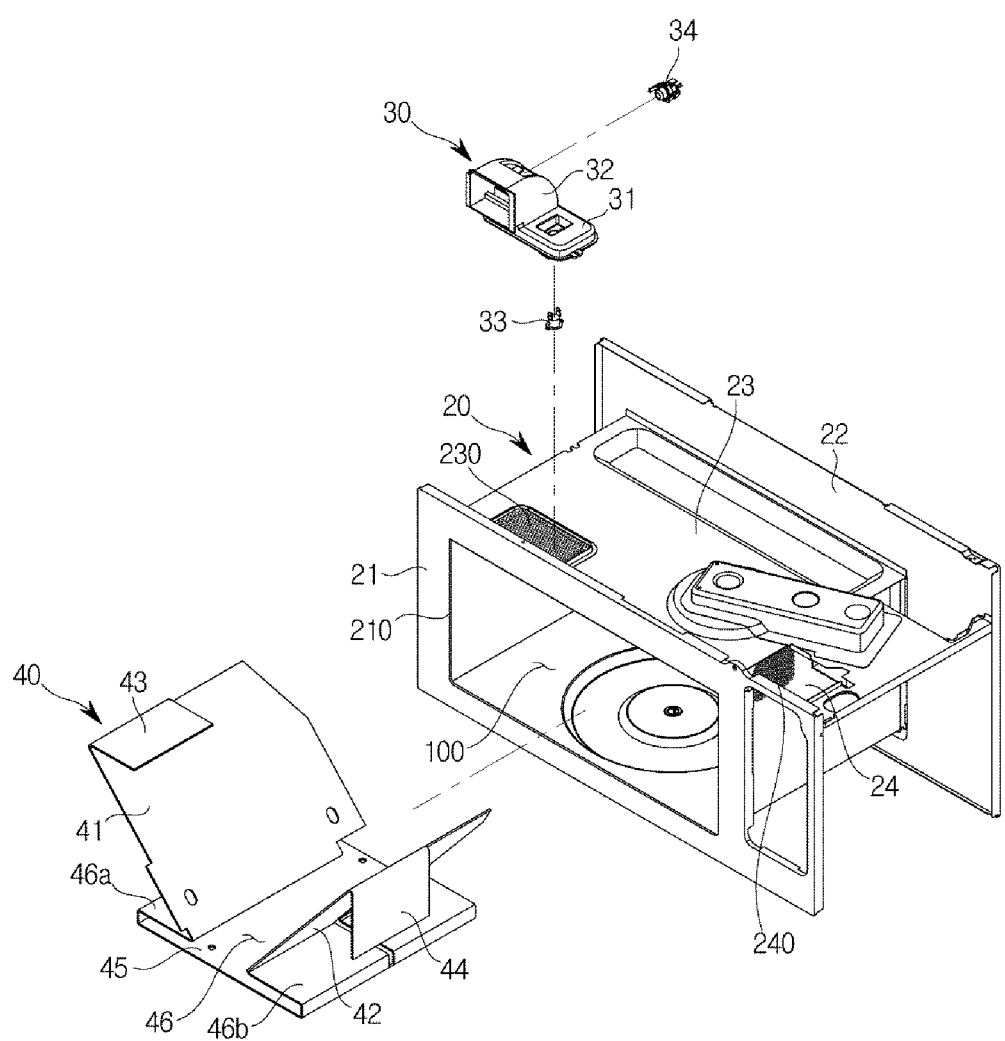
FIG. 3 is a view illustrating a state in which a frame unit and a packing member are separated according to an embodiment.
Figure 4:
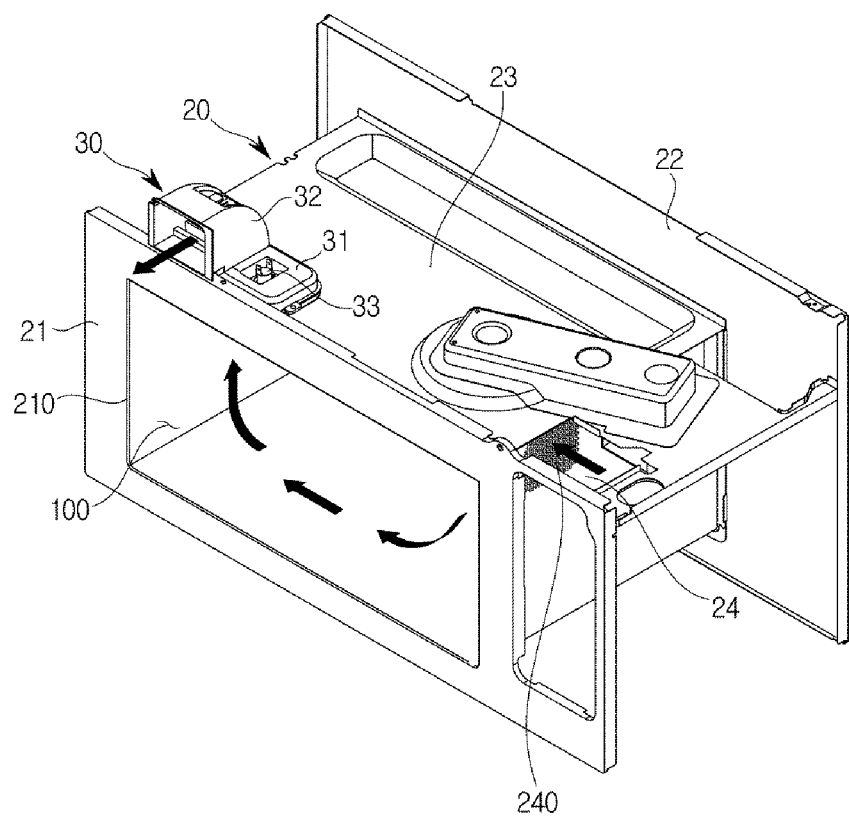
FIG. 4 is a view illustrating a circulation of air in a cooking chamber according to an embodiment.

FIG. 1 is a view illustrating a cooking apparatus according to an embodiment, FIG. 2 is a view illustrating a frame unit and a packing member of a cooking apparatus according to an embodiment, FIG. 3 is a view illustrating a state in which a frame unit and a packing member are separated according to an embodiment and FIG. 4 is a view illustrating a circulation of air in a cooking chamber according to an embodiment.

Referring to FIGS. 1 to 4, a cooking apparatus 1 according to an embodiment includes a main body 10 having a cooking chamber 100 in which food is received and cooked. At least a portion of a front side of the main body 10 may be opened or closed by a door 11. A user may open the door 11 to put food into the cooking chamber 100 or take out the food placed in the cooking chamber 100. In the cooking chamber 100, a plate 14 may be rotatably provided. Food may be placed on the plate 14 and cooked.

On the front side of the main body 10, an operation panel 12 for operating the cooking apparatus 1 may be provided. The operation panel 12 may be provided with an operation unit 121 such as a plurality of operation buttons or dials. In addition, the operation panel 12 may be provided with a display unit 120 on which the operation of the cooking apparatus 1 is displayed.

Hereinafter, the cooking apparatus 1 will be described as a microwave oven. The cooking apparatus 1 may also be an oven.

When the cooking apparatus 1 is operated with food placed on the plate 14, a high frequency is radiated into the cooking chamber 100, and the molecular arrangement of the water contained in the food is repeatedly converted by the radiated high frequency, a frictional heat is generated between the molecules, and the food placed in the cooking chamber 100 may be cooked by the frictional heat.

In order to improve the cooking efficiency of food, the main body 10 may be provided with a fan (not shown) for circulating air inside the cooking chamber 100. The fan circulates air inside the cooking chamber 100 so that the food may be uniformly cooked.

The main body 10 may include a frame unit 20 on which various components constituting the cooking apparatus 1 are mounted. The cooking chamber 100 may be formed by the frame unit 20.

The frame unit 20 includes a front frame 21 having an opening 210 formed therein, a rear frame 22 forming a rear surface of the main body 10, an upper frame 23 provided at an upper portion of the frame unit 20 to connect the front frame 21 and the rear frame 22 and a side frame 24 provided at a side of the frame unit 20 to connect the front frame 21 and the rear frame 22.

The front frame 21, the rear frame 22, the upper frame 23, and the side frame 24 may be integrally formed, or may be separately manufactured and then connected.

A magnetron generating a high frequency supplied into the cooking chamber 100, a high voltage transformer for applying a high voltage to the magnetron, the display unit 120 provided at the high voltage condenser and the operation panel 12, and a printed circuit board or the like connected to the operation unit 121 or the like may be provided at one side of the side frame 24. In addition, a fan for circulating air inside the cooking chamber 100 may be further provided at one side of the side frame 24.

The frame unit 20 may be provided with an inlet 240 through which external air is introduced and an outlet 230 through which the air inside the cooking chamber 100 is discharged to the outside. The inlet 240 may be formed on the side frame 24 and the outlet 230 may be formed on the upper frame 23. The positions of the inlet 240 and the outlet 230 are not limited to those described above.

External air may be introduced into the cooking chamber 100 through the inlet 240 and the air inside the cooking chamber 100 may be discharged to the outside through the outlet 230 by the operation of the fan. By circulating the air inside the cooking chamber 100, the food inside the cooking chamber 100 may be efficiently cooked.

When the cooking apparatus 1 is manufactured and then packaged and transported, the plate 14 and the manual for explaining the operation method of the cooking apparatus 1 and the like may be received in the cooking chamber 100. The plate 14 may be fixed by a packing member 40 so as not to move in the cooking chamber 100 during transportation. The plate 14 may be provided to be at least partially surrounded by the packing member 40. Therefore, when the cooking apparatus 1 is packaged and transported, not only the plate 14 is fixed so as not to move in the cooking chamber 100, but also the plate 14 may be prevented from being damaged from an external impact.

The packing member 40 may be made of a material such as corrugated fiber board made of material including paper or Styrofoam, which are light and prevent the plate 14 from being damaged from an external impact.

When the cooking apparatus 1 is operated initially, the cooking apparatus 1 should be operated in a state in which the packing member 40 and the manual or the like placed inside the cooking chamber 100 are taken out to the outside. However, when the cooking apparatus 1 is operated with the packing member 40 or the manual or the like placed inside the cooking chamber 100 by some users who have not recognized the packing member 40 and the manual or the like placed inside the cooking chamber 100, the manual and the packing member may be ignited. If an unpacked food is placed inside the cooking chamber 100, a wrapper that packs the food may be ignited.

Since outside air is supplied to the inside of the cooking chamber 100 by the fan, a fire generated in the cooking chamber 100 may not be extinguished and may spread to the outside.

Therefore, the cooking apparatus 1 may be provided with a cutoff switch 33 for detecting a fire and stopping an operation of the cooking apparatus 1 in order to prevent such a fire from occurring. A guide unit 30 may be positioned above the cooking chamber 100. In detail, the cutoff switch 33 may be located on a side of the outlet 230 formed on the upper frame 23.

The cutoff switch 33 may be made of a bimetal material. The cutoff switch 33 may be connected to a circuit associated with the operation of the cooking apparatus 1. The connection of the circuit relating to the operation of the cooking apparatus 1 may be cut off by the cutoff switch 33 so that the operation of the cooking apparatus 1 is stopped if a fire occurs inside the cooking chamber 100.

The cutoff switch 33 is made by attaching two types of thin metals having different thermal expansion coefficients. When heat is applied to the cutoff switch 33, the metal having a larger coefficient of thermal expansion expands more than the other metal and bends to the opposite side. When the temperature of the cutoff switch 33 is lowered, it is returned to its original state. By using the properties of the bimetal, the cutoff switch 33 may connect or disconnect the circuit associated with the operation of the cooking apparatus 1 according to the temperature.

That is, when food is cooked normally in the cooking chamber 100, the cutoff switch 33 is connected to the circuit related to the operation of the cooking apparatus 1, but if a fire occurs inside the cooking chamber 100 and the temperature inside the cooking chamber 100 rises, the cutoff switch 33 may be bent to disconnect the circuit.

When the cutoff switch 33 is bent, the circuit related to the operation of the cooking apparatus 1 is cut off, and the operation of the cooking apparatus 1 may be stopped. In detail, when the circuit is disconnected by the cutoff switch 33, no heat source or high frequency is supplied to the inside of the cooking chamber 100, and the fan for circulating the air inside the cooking chamber 100 is stopped.

As described above, if a fire occurs in the cooking chamber 100, the operation of the cooking apparatus 1 is stopped by the cutoff switch 33, so that a fire generated in the cooking chamber 100 is prevented from spreading.

The guide unit 30 for guiding a flow of the air discharged from the outlet 230 may be provided on the outlet 230 side of the upper frame 23. The guide unit 30 may be mounted on the upper surface of the upper frame 23. The guide unit 30 may include a base 31 provided to cover the outlet 230 and a guide portion 32 bent from one side of the base 31.

When the guide unit 30 is mounted on the outlet 230, the air discharged through the outlet 230 may be guided by the guide portion 32 to flow forward of the cooking apparatus 1. The direction in which the air is guided by the guide portion 32 is not limited to that described above.

The cutoff switch 33 may be mounted on the guide unit 30. The cutoff switch 33 may be positioned adjacent to the outlet 230 so as to quickly stop the operation of the cooking apparatus 1 if a fire inside the cooking chamber 100 occurs. For example, the cutoff switch 33 may be mounted on the base 31 and spaced away from the outlet 230 by approximately 8 mm. The interval between the cutoff switch 33 and the outlet 230 is not limited to that described above.

The guide unit 30 may further include a gas sensor 34 for sensing the temperature inside the cooking chamber 100, for example. The gas sensor 34 may be mounted on the guide portion 32. The gas sensor 34 senses the amount of gas discharged from the outlet 230. The control unit determines whether or not the cooking of the food is completed in the cooking chamber 100 according to the amount of gas sensed by the gas sensor 34. When it is determined that the cooking of the food has been completed, the control unit stops the cooking operation.

The operation of the cooking apparatus 1 can be stopped by the cutoff switch 33 if a fire occurs in the cooking chamber 100, but air may be introduced into the cooking chamber 100 through the inlet 240 and the outlet 230 from the outside. When air continuously flows into the cooking chamber 100, a fire generated in the cooking chamber 100 cannot be extinguished.

The packing member 40 of the present disclosure may be provided to block the inlet 240 and the outlet 230 so that a fire generated inside the cooking chamber 100 can be reliably extinguished.

Hereinafter, a structure in which the packing member 40 is located inside the cooking chamber 100 to block the inlet 240 and the outlet 230 will be described.

Figure 5A:
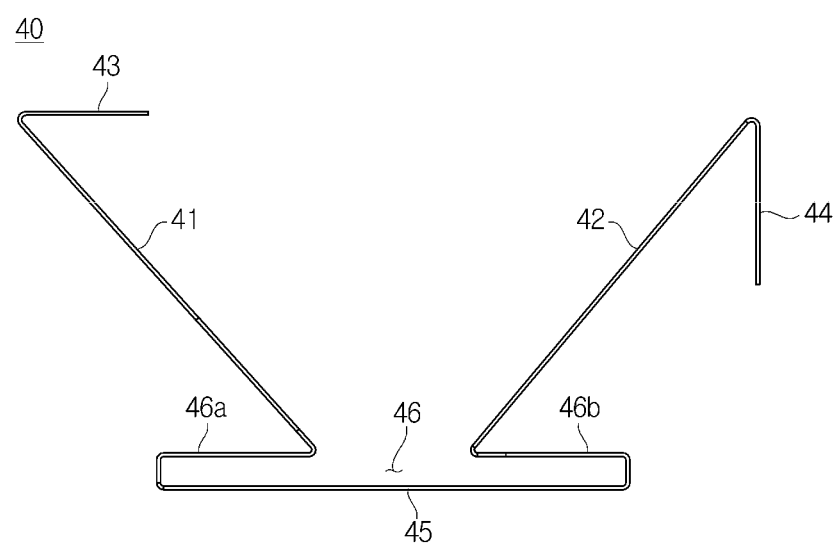
FIG. 5A is a perspective view illustrating a packing member according to an embodiment.
Figure 5B:
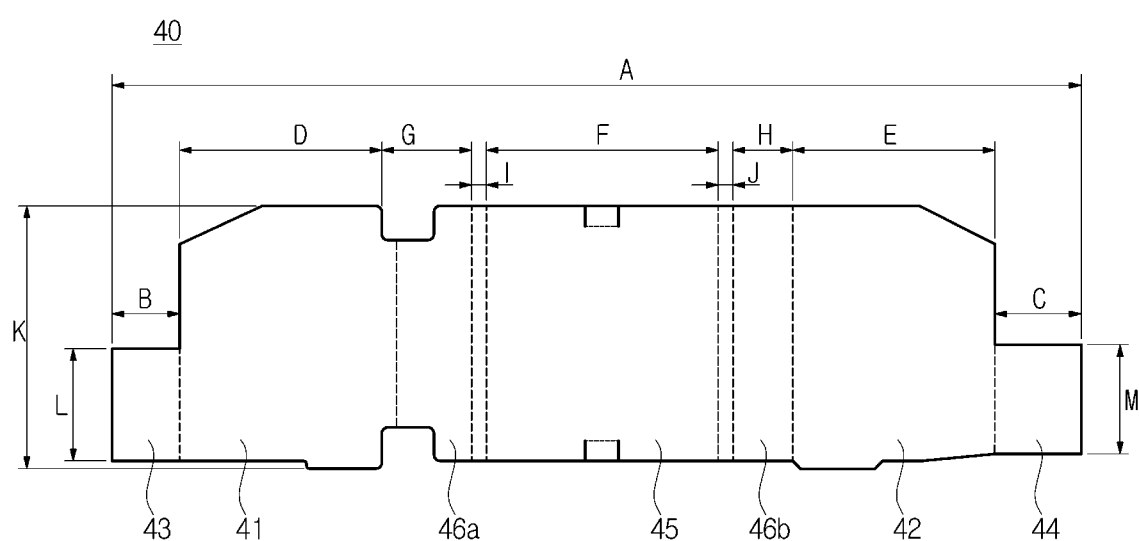
FIG. 5B is a plan view illustrating a packing member according to an embodiment.
Figure 6:
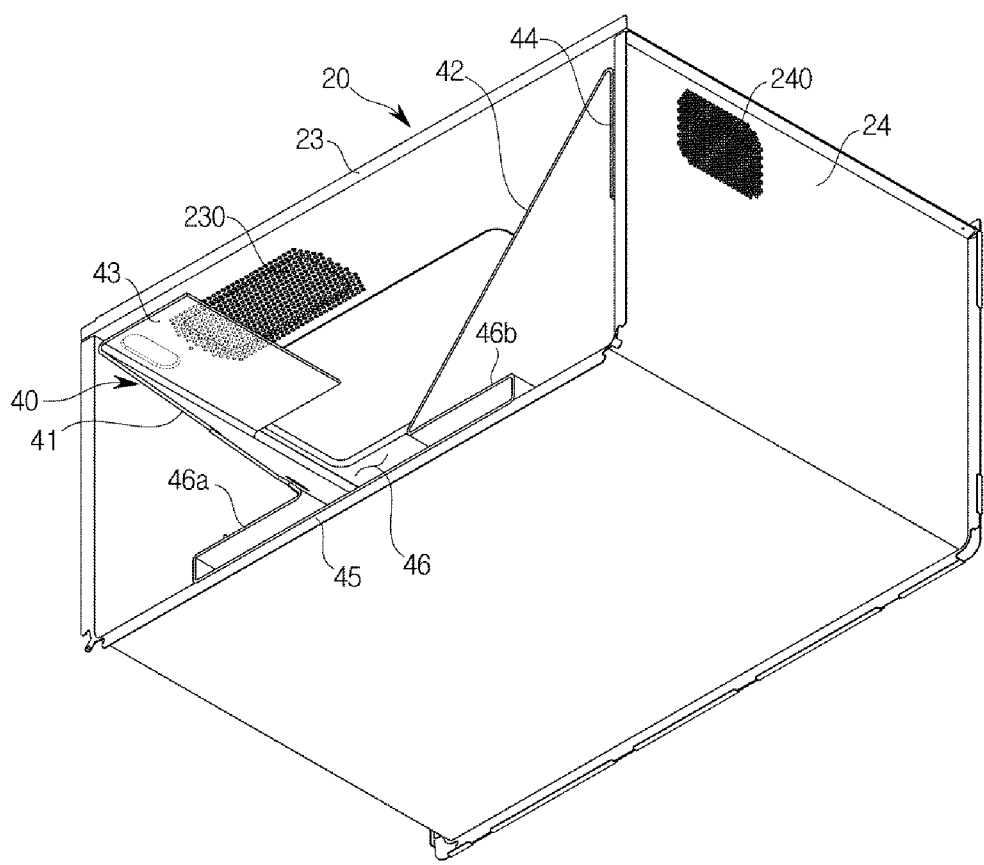
FIG. 6 is a view illustrating a state in which an outlet is covered by a packing member according to an embodiment.

FIG. 5A is a perspective view illustrating a packing member according to an embodiment, FIG. 5B is a plan view illustrating a packing member according to an embodiment and FIG. 6 is a view illustrating a state in which an outlet is covered by a packing member according to an embodiment.

Referring to FIGS. 5A to 6, the packing member 40 according to an embodiment may be accommodated in the cooking chamber 100 and cover the inlet 240 and the outlet 230, respectively. Further, the packing member 40 serves as a package for the plate 14 so as not to be damaged. The packing member 40 may be made of a material such as paper, corrugated fiber board, Styrofoam or the like so that the weight of the packing member 40 is light and the plate 14 is not damaged by an external impact.

The packing member 40 may include a first flange 43 to cover the outlet 230 and a second flange 44 to cover the inlet 240. The packing member 40 may also include a receiving portion 46 in which the plate 14 is located. When the packing member 40 is positioned in the cooking chamber 100, the receiving portion 46 may be located on the bottom surface side of the frame unit 20 forming the cooking chamber 100.

The packing member 40 includes a seating portion 45 that is seated on the bottom surface of the frame unit 20. The receiving portion 46 in which the plate 14 is accommodated may be formed by being bent from both sides of the seating portion 45. The packing member 40 includes a first interfering portion 46a and a second interfering portion 46b that are bent at both sides of the seating portion 45 and positioned to face the seating portion 45.

The plate 14 may be received in the receiving portion 46 formed by the seating portion 45, the first interfering portion 46a and the second interfering portion 46b. When the plate 14 is received in the receiving portion 46, at least a portion of the plate 14 is interfered by the first interfering portion 46a and the second interfering portion 46b and the plate 14 is not easily separated from the receiving portion 46.

The plate 14 is surrounded by the seating portion 45, the first interfering portion 46a and the second interfering portion 46b which together form the receiving portion 46 so that it is protected from being damaged by an external impact.

The first interfering portion 46a and the first flange 43 may be connected by a first arm 41. The second interfering portion 46b and the second flange 44 may be connected by a second arm 42. The first flange 43 may be formed by bending the first arm 41. The second flange 44 may be formed by bending the second arm 42.

The first arm 41 may be bent and extended from the first interfering portion 46a so that the first flange 43 provided at one side thereof may cover the outlet 230. The second arm 42 may be bent and extended from the second interfering portion 46b so that the second flange 44 provided at one side thereof may cover the inlet 240.

The packing member 40 may be integrally formed. For example, the first arm 41, the second arm 42, the first flange 43, the second flange 44, the seating portion 45, the first interfering portion 46a and the second interfering portion 46b may be formed by folding a single paper panel. Hereinafter, the specification of the paper panel for forming the packing member 40 will be described.

The paper panel forming the packing member 40 may have a total width A of 1500 mm and a total height K of 350 mm. A width B of the first flange 43 is 90 mm and a width C of the second flange 44 is 115 mm. The first arm 41 has a width D of 270 mm and the second arm 42 has a width E of 270 mm. A width F of the seating portion 45 may be 310 mm. A width G of the first interfering portion 46a may be 100 mm and a width H of the second interfering portion 46b may be 80 mm.

The seating portion 45 and the first interfering portion 46a may be spaced apart from each other by a predetermined height I and the seating portion 45 and the second interfering portion 46b may be spaced apart from each other by a predetermined height J so that the receiving portion 46 is formed by the seating portion 45, the first interfering portion 46a and the second interfering portion 46b.

The height I between the seating portion 45 and the first interfering portion 46a and the height J between the seating portion 45 and the second interfering portion 46b may be set appropriately according to the thickness of the plate 14 inserted into the receiving portion 46. For example, the height I between the seating portion 45 and the first interfering portion 46a and the height J between the seating portion 45 and the second interfering portion 46b may be 20 mm, respectively.

The height K of the first arm 41, the second arm 42, the first interfering portion 46a and the second interfering portion 46b is 350 mm, but a height L of the first flange 43 and a height M of the second flange 44 may be smaller than the total height K.

The height L of the first flange 43 and the height M of the second flange 44 may be configured to cover the outlet 230 or the inlet 240, respectively. For example, the height L of the first flange 43 may be 150 mm, and the height M of the second flange 44 may be 145 mm.

Since the specification of the packing member 40 is provided as described above, the first flange 43 may cover 50% of the outlet 230 and the second flange 44 may cover the entire inlet 240. The specification of the packing member 40 may be appropriately varied according to the cooking apparatus 1 and even if the packing member 40 has the same size, a rate of covering the outlet 230 and a rate of covering the inlet 240 may differ depending on the cooking apparatus 1.

When the cooking apparatus 1 is manufactured, packaged and transported, the packing member 40 may be accommodated in the cooking chamber 100. The packing member 40 receives the plate 14 and fixes the plate 14 in the cooking chamber 100 so as not to move. The first flange 43 is configured to cover at least a portion of the outlet 230 and the second flange 44 is configured to cover the inlet 240 when the packing member 40 is received in the cooking chamber 100.

For example, the first flange 43 may be configured to cover 50% of the area of the outlet 230, and the second flange 44 may be configured to cover the entire inlet 240. Alternatively, the first flange 43 may cover less than 50% of the area of the outlet 23, or may cover more than 50% of the area of the outlet 230, and the second flange 44 may be configured to cover only a portion of the inlet 240.

A fire may occur inside the cooking chamber 100 when the cooking apparatus 1 is operated with the packing member 40 and a manual positioned inside the cooking chamber 100. If a fire occurs inside the cooking chamber 100, a circuit is cut off by the cutoff switch 33, so that the operation of the cooking apparatus 1 may be stopped. At least a portion of the outlet 230 and the inlet 240 are covered by the first flange 43 and the second flange 44 of the packing member 40 so that external air cannot flow into the cooking chamber 100 easily and a fire occurring in the cooking chamber 100 can be quickly and reliably extinguished.

Since the packing member 40 covers at least a portion of the inlet 240 and the outlet 230 so that external air cannot flow into the cooking chamber 100 easily, even if the cooking apparatus 1 is operated in a state where the packing member 40 and the manual are located in the cooking chamber 100, a fire can be extinguished so as not to spread to the outside.

Figure 7:
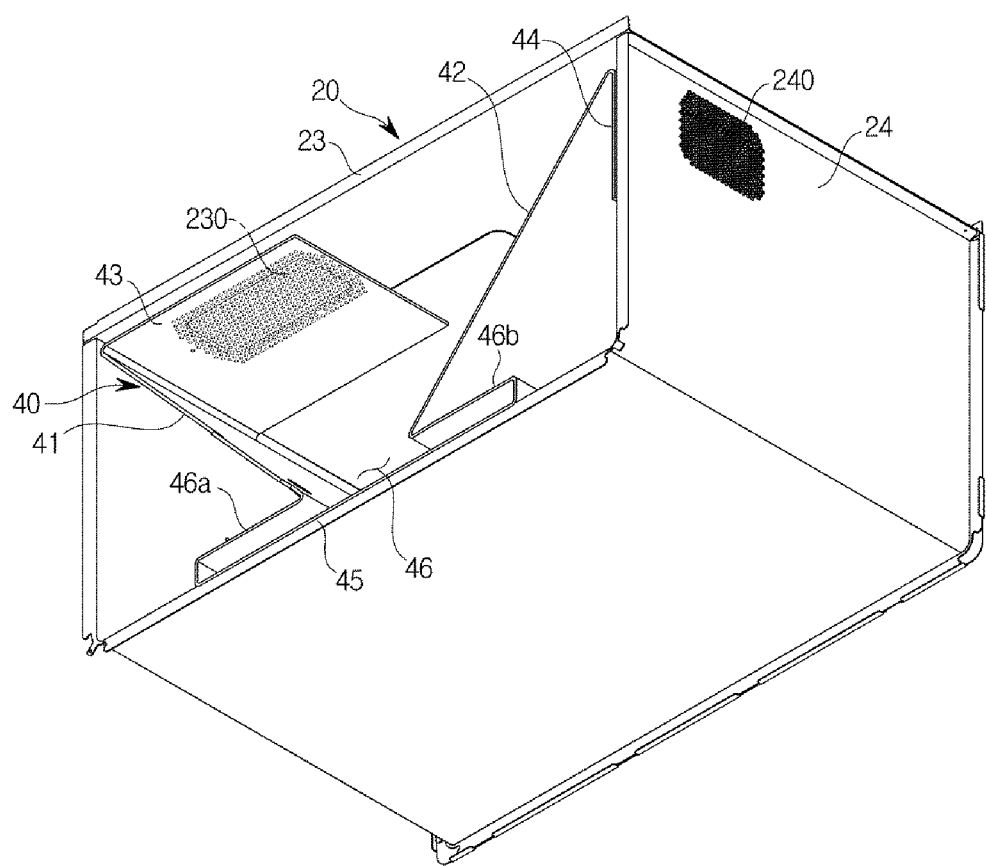
FIG. 7 is a view illustrating a state in which an outlet is covered by a packing member according to another embodiment.

FIG. 7 is a view illustrating a state in which an outlet is covered by a packing member according to another embodiment.

Components of the packing member 40 shown in FIG. 6 other than the first flange 43a can be similarly applied to a packing member 40a shown in FIG. 7.

The first flange 43a may be provided to cover the entire outlet 230. The second flange 44 may cover the entire inlet 240. When the packing member 40a is accommodated in the cooking chamber 100, the entire inlet 240 and the entire outlet 230 are covered, so that an inflow of air from an outside is blocked. Therefore, even if a fire occurs in the cooking chamber 100, air cannot flow into the cooking chamber 100 easily from the outside and a fire occurring in the cooking chamber 100 can be quickly and reliably extinguished.

An embodiment in which a portion of the outlet 230 is covered is shown in FIG. 6 and another embodiment in which the outlet 230 is entirely covered is shown in FIG. 7, but a structure in which a portion of the inlet 240 is covered or the entire inlet 240 is covered is also possible.

As described above, in the present disclosure, the packing members 40 and 40a accommodated in the cooking apparatus 1 are provided to cover the outlet 230 and the inlet 240 so that a fire occurring in the cooking chamber 100 can be quickly and reliably extinguished.

Therefore, even if a user inadvertently operates the cooking apparatus 1 while the packing members 40, 40a and a manual are located in the cooking chamber 100, a fire occurring inside the cooking chamber 100 spreading to the outside and leading to a big fire can be prevented.

As is apparent from the above description, according to embodiments of the present disclosure, when the cooking apparatus is operated with the packing member positioned inside the cooking apparatus, a fire occurring inside the cooking apparatus can be quickly and reliably extinguished.

Although a few embodiments of the present invention have been shown and described above, the invention is not limited to the aforementioned specific exemplary embodiments. Those skilled in the art may variously modify the invention without departing from the gist of the invention claimed by the appended claims.

What is claimed is:

1. A packing member configured to be placed inside a microwave oven, the microwave oven comprising a cooking plate, an air inlet, and an air outlet, the packing member comprising:
   a component receiving portion configured to receive the cooking plate;
   a first arm bent and extending from the component receiving portion to an upper inside surface of the microwave oven when the packing member is inside the microwave oven;
   a second arm bent and extending from the component receiving portion to the upper inside surface of the microwave oven when the packing member is inside the microwave oven; and
   a flange bent from the first arm and/or the second arm, and configured to cover, from the inside of the microwave oven, at least one of the air inlet and the air outlet, to prevent air flowing easily through the at least one of the air inlet and the air outlet when the packing member is inside the microwave oven.

2. The packing member according to claim 1, wherein the flange further includes a first flange bent from the first arm to cover the air outlet and a second flange bent from the second arm to cover the air inlet.

3. The packing member according to claim 2, wherein the first flange is located at a first side of the packing member, and the second flange is located at a second side of the packing member.

4. The packing member according to claim 1, wherein the air inlet is provided at a side surface of the microwave oven, and the air outlet is provided at an upper surface of the microwave oven.

5. The packing member according to claim 1, wherein the flange is configured to cover the entire air inlet.

6. The packing member according to claim 1, wherein the flange is configured to cover the entire air outlet.

7. The packing member according to claim 1, wherein the flange is configured to cover half of the air outlet.

8. The packing member according to claim 1, wherein the component receiving portion is formed by bending a part of the packing member.

9. The packing member according to claim 1, wherein the packing member is provided to cover at least one component of the microwave oven.

10. A microwave oven comprising:
    a frame including a cooking chamber, an air inlet, and an air outlet;
    a plate configured to be placed in the cooking chamber; and
    a packing member including a component receiving portion configured to cover at least a portion of the plate, a first arm bent and extending from the component receiving portion to an upper surface of the cooking chamber when the packing member is inside the cooking chamber, a second arm bent and extending from the component receiving portion to the upper surface of the cooking chamber when the packing member is inside the cooking chamber, a first flange bent from the first arm, and a second flange bent from the second arm,
    wherein the first flange is configured to cover at least a portion of the air outlet, and the second flange is configured to cover at least a portion of the air inlet.

11. The microwave oven according to claim 10, wherein the first flange is configured to cover the entire air outlet.

12. The microwave oven according to claim 10, wherein the second flange is configured to cover the entire air inlet.

13. The microwave oven according to claim 10, wherein the packing member is made of a material containing any one of paper and Styrofoam.

14. The microwave oven according to claim 10, further comprising a cutoff switch configured to turn on or off an operation of the microwave oven, and located at the air outlet.

15. The microwave oven according to claim 14, wherein the cutoff switch is provided to disconnect a circuit associated with an operation of the microwave oven based on a detection of a fire in the cooking chamber.

16. The microwave oven according to claim 15, wherein the circuit comprises a fan configured to circulate air inside the cooking chamber.

17. The microwave oven according to claim 14, wherein the cutoff switch includes a bimetal material.

18. The microwave oven according to claim 14, wherein the air outlet is formed on an upper surface of the frame and the air inlet is formed on a side surface of the frame.

* * * * *